(12) United States Patent
Nyström et al.

(10) Patent No.: US 12,513,355 B2
(45) Date of Patent: Dec. 30, 2025

(54) METHOD AND IMAGE-PROCESSING DEVICE FOR ADDING AN OVERLAY TO A VIDEO SEQUENCE

(71) Applicant: Axis AB, Lund (SE)

(72) Inventors: Johan Nyström, Lund (SE); Johan Förberg, Lund (SE); Song Yuan, Lund (SE)

(73) Assignee: AXIS AB, Lund (SE)

( * ) Notice: Subject to any disclaimer, the term of this patent is extended or adjusted under 35 U.S.C. 154(b) by 266 days.

(21) Appl. No.: 18/536,270

(22) Filed: Dec. 12, 2023

(65) Prior Publication Data

US 2024/0205491 A1 Jun. 20, 2024

(30) Foreign Application Priority Data

Dec. 16, 2022 (EP) .................................... 22214260

(51) Int. Cl.
*H04N 21/431* (2011.01)
*G06V 20/52* (2022.01)
*H04N 19/00* (2014.01)

(52) U.S. Cl.
CPC ......... *H04N 21/4316* (2013.01); *G06V 20/52* (2022.01); *H04N 19/00* (2013.01)

(58) Field of Classification Search
CPC .. H04N 21/4316; H04N 19/00; H04N 19/172; H04N 19/93; H04N 19/20; H04N 19/46; H04N 21/234; H04N 21/4312; H04N 21/8146; H04N 5/265; H04N 7/18; G06V 20/52; G06T 9/001; G06T 11/206; G06T 11/60

See application file for complete search history.

(56) References Cited

U.S. PATENT DOCUMENTS

| | | | | |
|---|---|---|---|---|
| 9,161,030 | B1* | 10/2015 | Masterson | ......... H04N 21/4402 |
| 2005/0041153 | A1 | 2/2005 | Matsubara | |
| 2016/0165271 | A1* | 6/2016 | Ardo | ........................ G06T 7/20 |
| | | | | 725/32 |
| 2020/0204828 | A1* | 6/2020 | Yuan | ...................... H04N 19/17 |

FOREIGN PATENT DOCUMENTS

WO 2009/013829 A1 1/2009

* cited by examiner

*Primary Examiner* — Kunal Langhnoja
(74) *Attorney, Agent, or Firm* — XSENSUS LLP (57) ABSTRACT

A method for adding an overlay to a video sequence includes determining whether a content of the overlay is updated within a time period; then determining whether to provide a second representation of the overlay in a compressed format, wherein it is determined to provide the second representation in response to determining that the content of the overlay is not updated within the time period, and wherein it is determined to not provide the second representation of the overlay in response to determining that the content of the overlay is updated within the time period; and when the second representation of the overlay has been provided, adding the second representation of the overlay to a video frame of the video sequence if a compression ratio of the second representation of the overlay with respect to a first representation of the overlay in an uncompressed format is above a threshold.

14 Claims, 10 Drawing Sheets

METHOD AND IMAGE-PROCESSING DEVICE FOR ADDING AN OVERLAY TO A VIDEO SEQUENCE

CROSS-REFERENCE TO RELATED APPLICATION

This application claims priority to European Patent Application No. 22214260.6 filed on Dec. 16, 2022, the entire disclosure of which is incorporated by reference herein.

TECHNICAL FIELD

The embodiments herein relate to a method and an image-processing device for adding an overlay to a video sequence. A corresponding computer program and a computer program carrier are also disclosed.

BACKGROUND

Surveillance of the public using imaging, in particular video imaging, is common in many areas around the world. Areas that may need monitoring are for example banks, stores, and other areas where security is needed, such as schools and government facilities. Other areas that may need monitoring are processing, manufacturing and logistics applications where video surveillance is primarily used to monitor processes.

Captured video images may be complemented with other image data also referred to as overlay objects, such as graphics. The graphics may for example be, an icon, a diagram, different masking graphics such as boxes or circles, or text.

A variety of image processing methods have been proposed in which an image signal acquired by taking images via a video camera etc., is superimposed with other image data such as characters and graphics. In an example, a video post processor, which may be referred to as an image compositor, overlays a graphics overlay onto video frames captured by the camera. In order to do so, the image compositor loads, or in other words reads, a representation of the graphics overlay and adds it to a video frame. The representation is usually a raster format representation of the graphics overlay. The raster format is also known as bitmap format. The raster format represents an image by pixels arranged in a two-dimensional grid, where each pixel includes one or more bits to represent the pixel value. For example, the ARGB32 format has 4 bytes per pixel, while the A8 format has 1 byte per pixel. Thus, the raster format is an example of an uncompressed format. An advantage of the raster format is that it can be rendered efficiently and fast by, e.g., a graphical processing unit (GPU). However, when the graphics overlay is represented in a raster format, the loading of the graphics overlay for each video frame represents a considerable cost in terms of memory bandwidth.

SUMMARY

An object of embodiments herein may thus be to obviate some of the problems mentioned above, or at least reduce the impact of them. Specifically, an object of embodiments herein may be how to reduce the memory bandwidth in connection to overlaying an overlay, such as a graphics overlay, onto a sequence of video frames.

Embodiments herein solve the above problems by controlling the representation format of the overlay based on whether or not the content of the overlay has been updated within a time period, for example within a time period which corresponds to at least the last two video frames. Although embodiments have been summarized below, the invention is defined by the independent claims. Preferred embodiments are defined in the dependent claims.

According to an aspect, the object is achieved by a method, performed by an image-processing device for adding an overlay to a video sequence. The method comprises determining whether or not a content of the overlay is updated within a time period.

The method further comprises determining, based on whether or not the content of the overlay is determined to be updated within the time period, whether or not to provide a compressed representation of the overlay in a compressed format. It is determined to provide the compressed representation in response to determining that the content of the overlay is not updated within the time period. It is determined to not provide the compressed representation in response to determining that the content of the overlay is updated within the time period.

When the compressed representation of the overlay has been provided the method further comprises adding the compressed representation of the overlay to video data of a video frame of the video sequence if a compression ratio of the compressed representation with respect to an uncompressed representation of the overlay in an uncompressed format is above a threshold, while if the compression ratio is below the threshold the method further comprises adding the uncompressed representation of the overlay to video data of the video frame of the video sequence.

When the compressed representation of the overlay has not been provided the method further comprises adding the uncompressed representation of the overlay to video data of the video frame of the video sequence.

According to another aspect, the object is achieved by an image-processing device configured to perform the above method.

According to further aspects, the object is achieved by a computer program and a computer program carrier corresponding to the aspects above.

The inventors have realized that overlays, such as graphic overlays, may also be represented in different compressed formats, such as in a run-length-encoded (RLE) format, in which the image information has been compressed, either lossless or lossy. Either way, a compressed format represents the overlay using less amount of data than the uncompressed format. An advantage of representing the overlay in a compressed format is that it is typically cheaper for the image compositor to load the compressed representation of the overlay compared to the uncompressed representation of the overlay. However, providing the compressed representation of the overlay comes with an overhead cost in terms of an extended processing time. In some cases, when the compressed representation of the overlay is generated from the uncompressed representation of the overlay, there is also an additional memory bandwidth cost since the encoder first has to load the uncompressed representation of the overlay before compressing it. In those cases, the combined memory bandwidth cost for first loading the uncompressed representation of the overlay by the encoder and then loading the compressed representation of the overlay by the image compositor is higher than the memory bandwidth cost for loading the uncompressed representation directly by the image compositor. Notably, this overhead cost appears each time a new compressed representation of the overlay is provided. During time periods when the content of the overlay changes between video frames, new compressed representations of the overlay would have to be provided frequently, thereby giving rise to a high overhead cost.

Embodiments herein make use of the fact that during time periods when the content of the overlay does not change between video frames, it is enough to provide a compressed representation of the overlay once, and then to load the same compressed representation of the overlay for every video frame for the time periods when the content of the overlay does not change. Thus, during periods when the content of the overlay does not change the option of using a compressed version of the overlay is advantageous since it reduces the memory bandwidth at a low overhead cost compared to using an uncompressed representation of the overlay.

Thus, the image-processing device will save memory bandwidth at a low overhead cost by adding the overlay in the compressed representation format when the overlay is not updated frequently.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
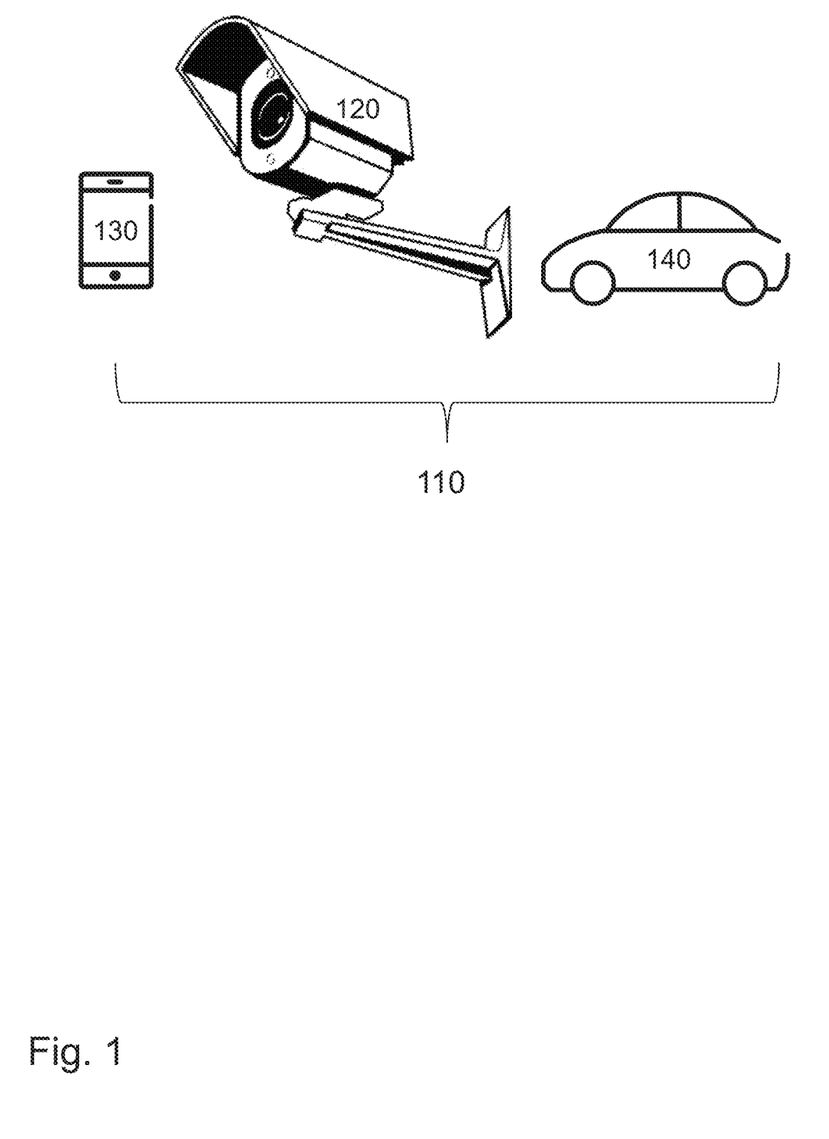
FIG. 1 illustrates exemplifying embodiments of image-capturing devices.

Embodiments herein may be implemented in an image-processing device. In some embodiments herein the image-processing device may comprise or be an image-capturing device such as a digital camera. FIG. 1 depicts various exemplifying image-capturing devices 110. The image-capturing device 110 may e.g., be or comprise any of a camcorder, a network video recorder, a camera, a video camera 120 such as a surveillance camera or a monitoring camera, a digital camera, a wireless communication device 130, such as a smartphone, including an image sensor, or a car 140 including an image sensor.

Figure 2:
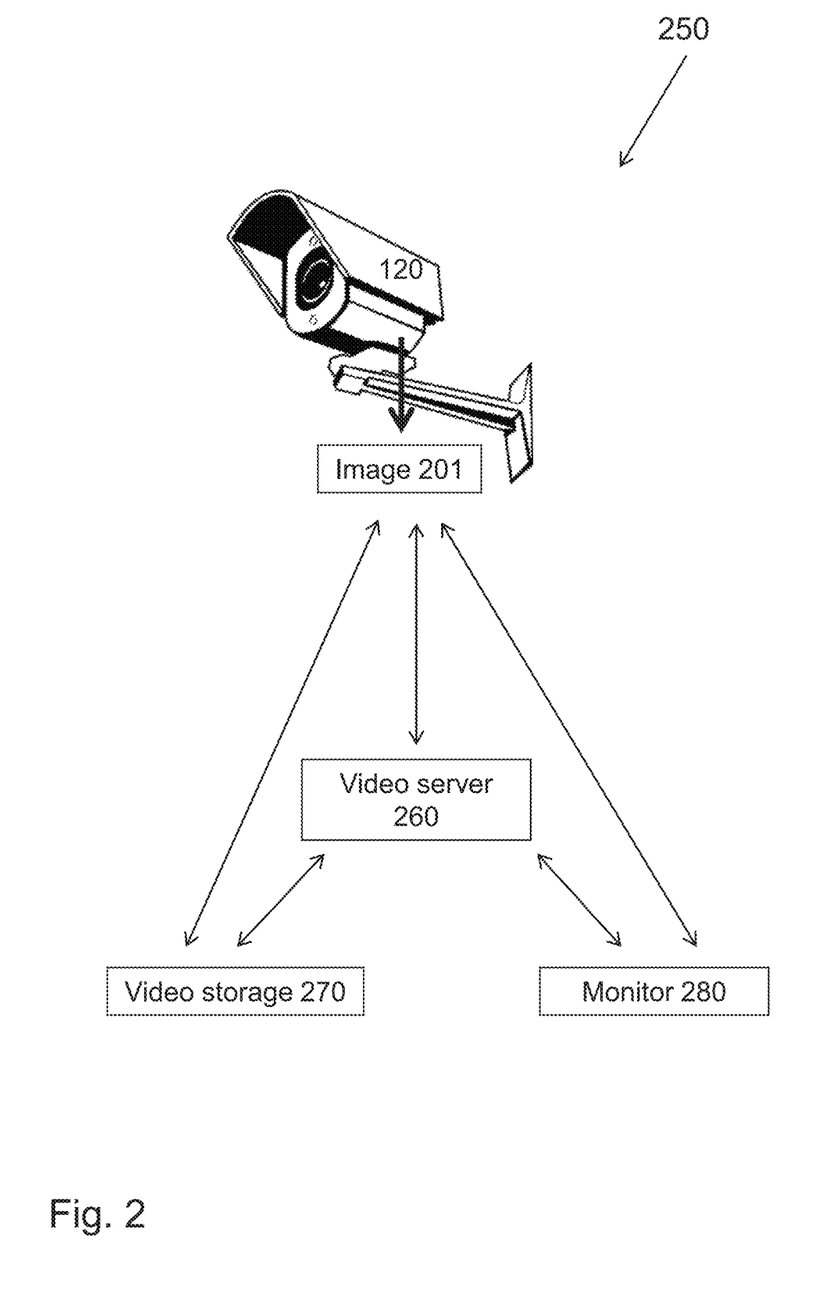
FIG. 2 illustrates exemplifying embodiments of a video network system.

FIG. 2 depicts an exemplifying video network system 250 in which embodiments herein may be implemented. The video network system 250 may include an image-capturing device, such as the video camera 120, which can capture and perform image processing on a digital image 201, such as a digital video frame. A video server 260 in FIG. 2 may obtain the video frame, for example from the video camera 120 over a network or the like, which is indicated in FIG. 2 with the double-pointing arrows. In some embodiments herein the image-processing device may comprise or be the video server 260.

The video server 260 is a computer-based device that is dedicated to delivering video.

However, in FIG. 2, the video server 260 is connected over the video network system 250, to the image-capturing device, here exemplified by the video camera 120. The video server 260 may further be connected to a video storage 270 for storage of video frames, and/or connected to a monitor 280 for display of video frames. In some embodiments the video camera 120 is connected directly with the video storage 270 and/or the monitor 280, as indicated by the direct arrows between these devices in FIG. 2. In some other embodiments the video camera 120 is connected to the video storage 270 and/or the monitor 280 via the video server 260, as indicated by the arrows between the video server 260 and the other devices.

Figure 3:
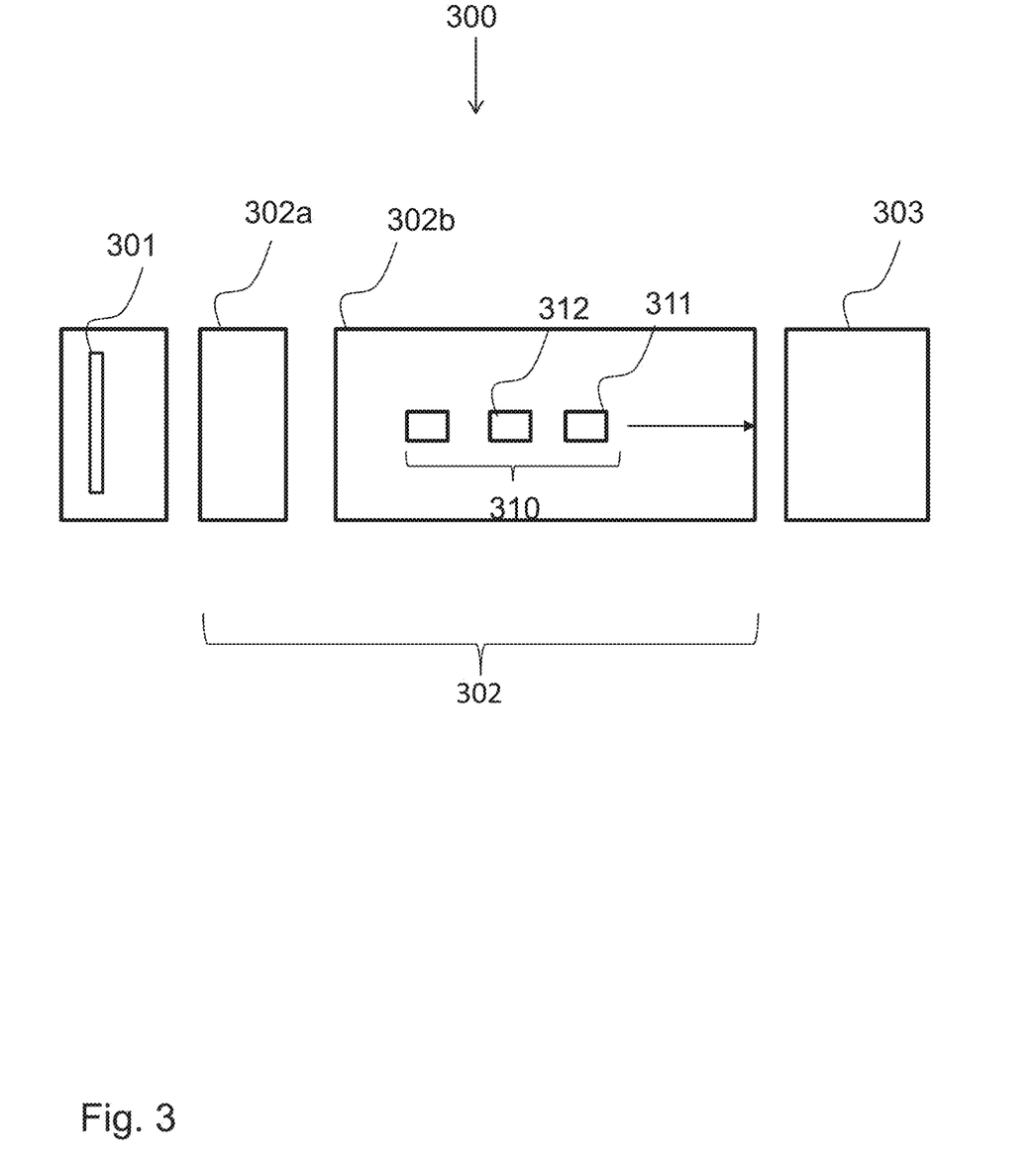
FIG. 3 is a schematic block diagram illustrating an exemplifying embodiment of an imaging system.

FIG. 3 is a schematic view of an imaging system 300, in this case of a digital video camera, such as the video camera 120. The imaging system 300 images a scene on an image sensor 301. The image sensor 301 may be provided with a Bayer filter, such that different pixels will receive radiation of a particular wavelength region, in a known pattern. Typically, each pixel of the captured image is represented by one or more values representing the intensity of the captured light within a certain wavelength band. These values are usually referred to as colour components, or colour channels. The term "image" may refer to an image frame or video frame including information originating from an image sensor that has captured the image.

After having read the signal of individual sensor pixels of the image sensors 301, different image processing actions may be performed by an image signal processor 302. The image signal processor 302 may comprise an image processing part 302a, sometimes referred to as an image processing pipeline, and a video post-processing part 302b.

Typically for video processing the images are comprised in a stream of images, also referred to as a stream of video frames. FIG. 3 illustrates a video stream 310 from the image sensor 301. The video stream 310 may comprise multiple captured video frames, such as a first captured video frame 311 and a second captured video frame 312. The stream of images may also be referred to as a video sequence.

Image processing may comprise application of overlays (e.g., privacy masks, explanatory text). The image signal processor 302 may also be associated with an analytics engine performing object detection, recognition, alarms, etc.

The image processing part 302a may e.g. perform image stabilization, apply noise filtering, distortion correction, global and/or local tone mapping, transformation, and flat-field correction. The video post-processing part 302b may for example crop parts of an image, apply overlays, and comprise the analytics engine. Thus, embodiments disclosed herein may be implemented by the video post-processing part 302b.

Following the image signal processor 302 the image may be forwarded to an encoder 303, wherein the information in the video frames is coded according to an encoding protocol, such as H.264. The encoded video frames are then forwarded to for example a receiving client, exemplified here with the monitor 280, to the video server 260, the storage 270, etc.

As mentioned above, an object of embodiments herein may be how to reduce the memory bandwidth in connection to overlaying an overlay, such as a graphics overlay, onto a sequence of video frames. In embodiments herein an overlay is an image to be overlaid on another image, such as onto a video frame of a video sequence.

Figure 4A:
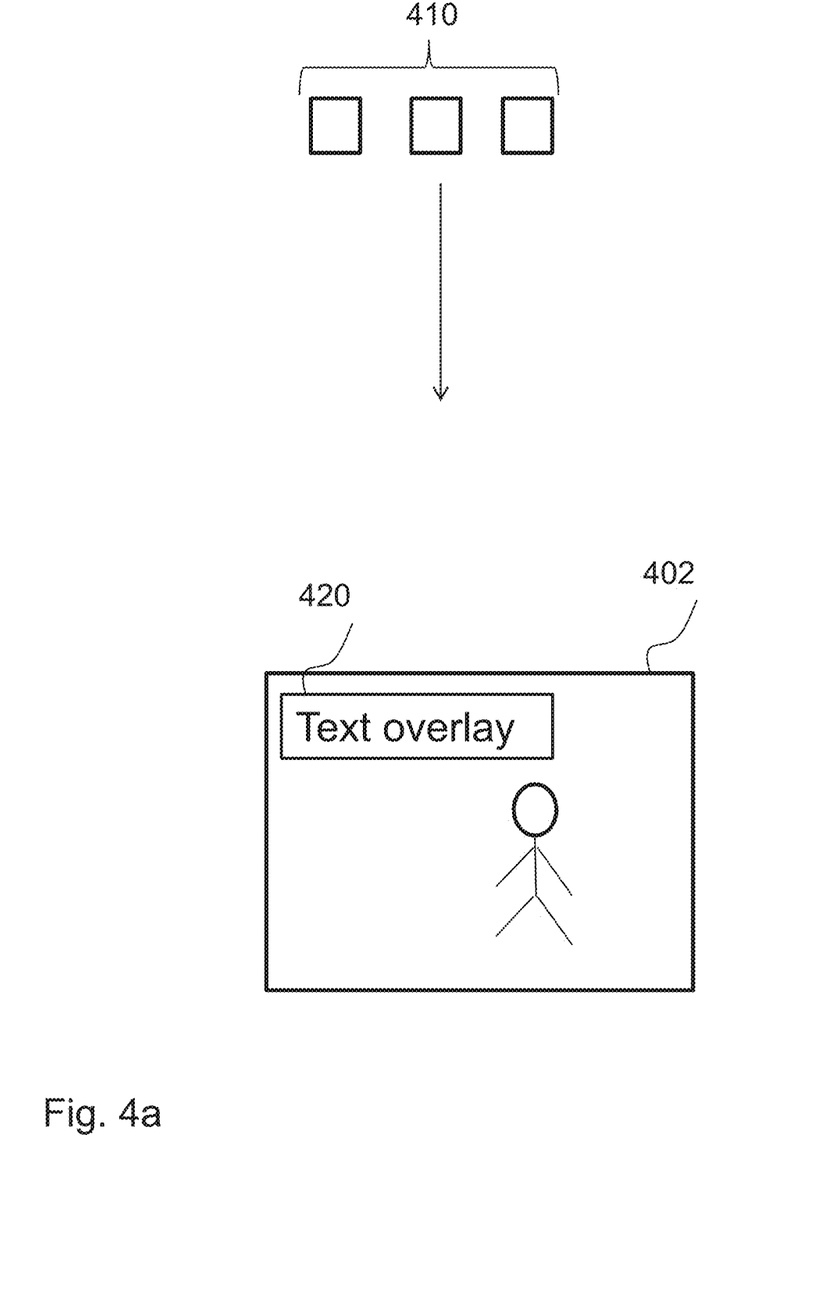
FIG. 4a is a schematic block diagram illustrating embodiments of a method in an image-processing device.

FIG. 4a illustrates a video sequence 410 corresponding to the video stream 310 of FIG. 3. The lower part of FIG. 4a illustrates content of a video frame 402 of the video sequence 420.

In FIG. 4a the video sequence 410 has been processed by overlaying an overlay 420 comprising text. Specifically, in FIG. 4a the video frame 402 has been processed by overlaying the overlay 420. In embodiments disclosed herein a content of the overlay 420 refers to image content of the overlay 420. Such image content may for example be an icon, a diagram, a bounding box, text, a privacy mask, another video frame from another camera or another channel, etc. Generally, the content of the overlay 420 may be static, but in embodiments disclosed herein the content of the overlay 420 is updated from time to time. For example, the content of the overlay 420 may be static for several sequential video frames, but sometimes it will change. For example, the content of the overlay 420 may be static for a first set of sequential video frames. Thus, there may be a first content of the overlay 420 to be overlaid with the first set of video frames. Then the content of the overlay 420 may change and be static again during a second set of video frames. There may be a second content of the overlay 420 to be overlaid with the second set of video frames. The change of the content of the overlay 420 may comprise change of text, animation of an icon, updating of a diagram, change of position of a bounding box, etc.

Figure 4B:
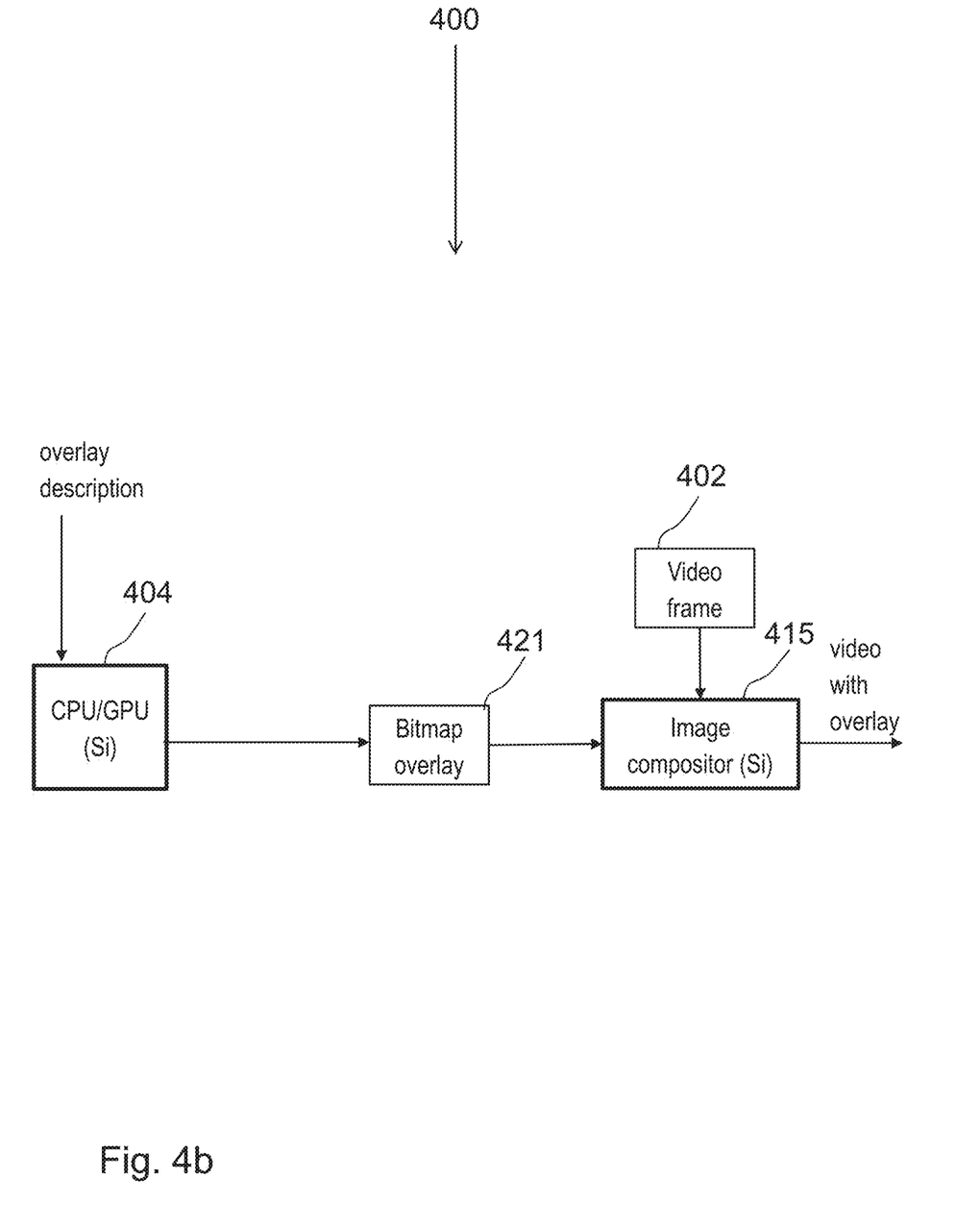
FIG. 4b is a schematic block diagram illustrating embodiments of an image-processing device and embodiments of a method in the image-processing device.

FIG. 4b illustrates a reference method of how an image-processing device 400, such as the image-capturing device 110 or the video server 260, may perform such overlaying. The image-processing device 400 may store a representation of the overlay 420 in an uncompressed representation format.

The representation of the overlay is in the form of an image and the format of the representation refers to an image format of the representation. Specifically, the overlay 420 may be represented by an uncompressed image format in which the image information has not been compressed. Thus, the representation of the overlay in the uncompressed representation is a direct representation of image pixels, such as a raster format or a block-based format. The raster format may also be referred to as a bitmap. In embodiments disclosed herein the representation of the overlay in the uncompressed representation format will be referred to as an uncompressed representation 421 of the overlay 420. Thus, in embodiments herein the uncompressed representation 421 of the overlay 420 is in the compressed representation format. The uncompressed representation 421 of the overlay 420 may further be referred to as a first representation 421 of the overlay 420. The uncompressed representation 421 may contain values describing colors for each pixel of an image of the overlay 420. The compressed representation 421 may further comprise some metadata about the overlay 420 like its color format, size, position in the video frame 402, etc.

The representation of the overlay 420 may be stored in one or more buffers or memory areas. In some embodiments herein at least two buffers are used such that writing and reading representations of the overlay 420 may be performed independently of each other.

For example, a first buffer may be available for writing a first representation of the overlay 420. The first representation of the overlay 420 may comprise a first content which may be new compared to a content of a previous representation of the overlay 420. When the first representation of the overlay 420 has been written to the first buffer a signal may be generated that indicates that the first buffer is available for reading and thus for adding the first representation of the overlay 420 to the video sequence 410. The signal may further indicate that the first content of the overlay 420 has been updated compared to a previous content of the representation of the overlay 420. The signal may indicate that the first buffer is active for reading and then adding the first content of the first buffer to the video sequence 410.

While the first buffer is available for reading a second buffer may be available for writing a second representation of the overlay 420. A content of the second representation of the overlay 420 may be updated and thus different from the first content.

When the second representation of the overlay 420 has been written to the second buffer a second signal may be generated that indicates that the second buffer is available for reading and thus for adding the second representation of the overlay 420 to the video sequence 410. The second signal may further indicate that the second content of the overlay 420 has been updated compared to the first content of the first representation of the overlay 420.

The representation of the overlay 420 may be rendered by the image-processing device 400 from a description of the overlay 420. The rendering may be performed by a Central Processing Unit (CPU) or a Graphic Processing Unit (GPU) 404 of the image-processing device 400. The CPU/GPU 404 may receive the description of the overlay with details of the overlay 420 to be added to the video frame 420. The description of the overlay may be in the form of a text file or a graphics file, detailing the content and visual appearance of the overlay 420. The description of the overlay may be in the form of a two-dimensional vector-based description, such as in scalable vector graphic (SVG) format, or a drawing command or instruction for a vector graphics library. The description of the overlay may also be a 3D graphics-based description in the form of a command, a texture and a shader. In some other embodiments the representation of the overlay 420 may be read from a library of rendered overlays.

The image-processing device 400 may further comprise an image-compositor 415 that overlays the representation of the overlay 420, e.g., overlays the uncompressed representation 421 of the overlay 420, such as a bitmap overlay, onto the video frame 402. An image-compositor generally refers to a component which combines two or more images to create one image. In this case, the image compositor 415 may combine the uncompressed representation 421 of the overlay 420 with the video frame 402. Thus, for each video frame for which an overlay is to be added the image-compositor 415 will load the representation of the overlay 420.

As mentioned above, since the loading of the representation of the overlay 420 is performed for each video frame, regardless of whether the representation of the overlay has been updated since the previous frame or not the loading of the representation of the overlay for each video frame represents a considerable cost in terms of memory bandwidth when the overlay 420 is represented in the raster format, e.g., by the bitmap overlay.

Figure 4C:
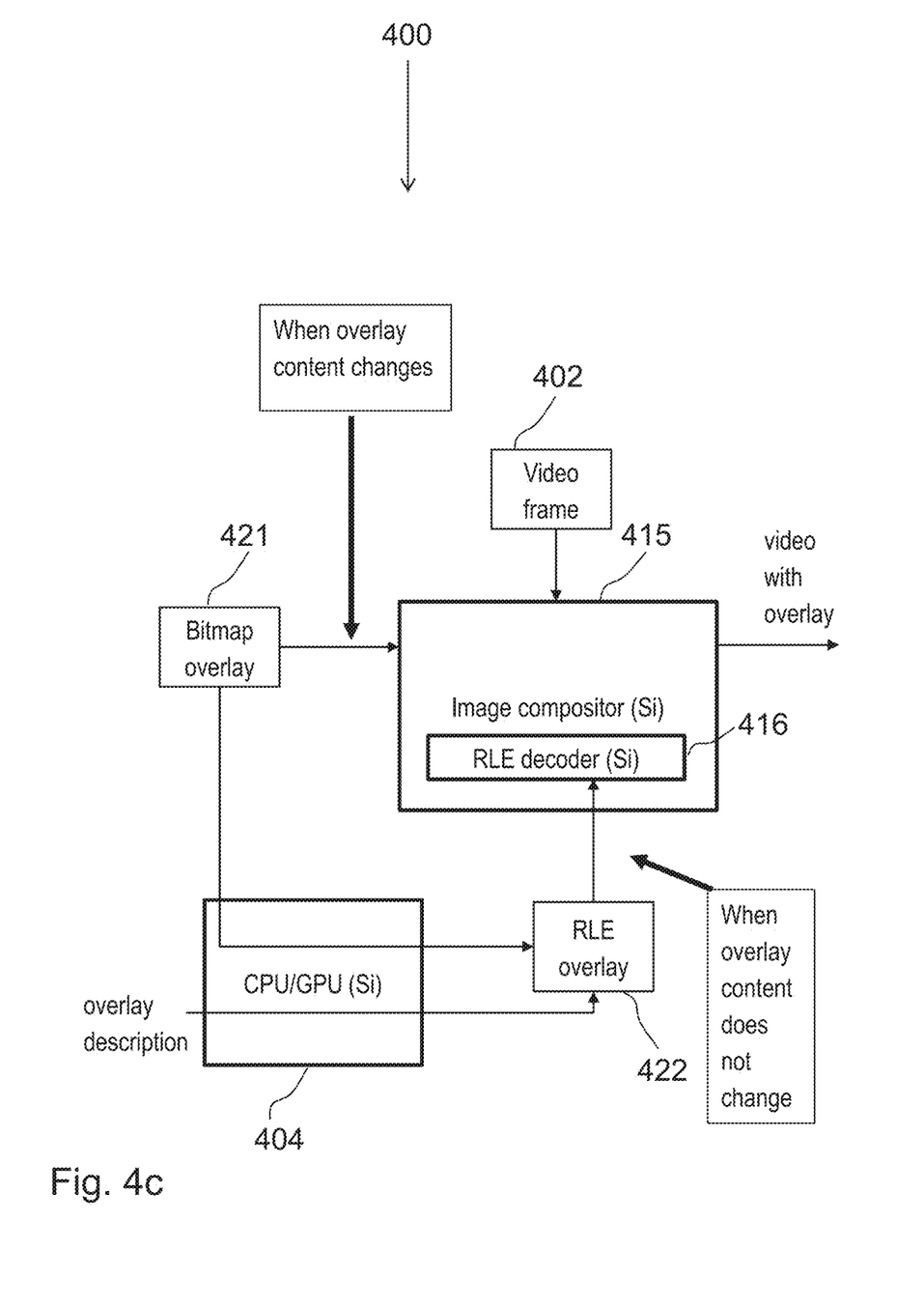
FIG. 4c is a schematic block diagram illustrating embodiments of an image-processing device and embodiments of a method in the image-processing device.

Embodiments herein will now be described with reference to FIG. 4c illustrating an enhanced method for adding the overlay 420 to the video sequence 410 and parts of the image-processing device 400 for performing the method. As mentioned above, overlays, such as graphic overlays, may also be represented in different compressed image formats, such as in the RLE format. A compressed format represents the overlay 420 using less amount of data than the uncompressed format. In particular, there may be an encoder, e.g., implemented in software together with the CPU or GPU 404, configured to compress, or in other words encode, the uncompressed format representation of the overlay 420 into a compressed format representation of the overlay 420. For example, there may be an RLE encoder, e.g., implemented in software together with the CPU or GPU 404, configured to run-length-encode the raster format representation of the overlay 420 into an RLE representation of the overlay. Also, there may be a decoder 416 for decoding coded image data, such as the RLE coded image data, before overlaying the representation of the overlay onto the video frames. The image-compositor 415 may comprise the decoder 416 which may be hardware-implemented. Thus, the uncompressed representation 421 of the overlay 420, such as the bitmap overlay, may be rendered in a first representation format of the overlay 420 which is uncompressed, while a compressed representation 422 of the overlay 420, such as an RLE overlay, may be rendered in a second representation format of the overlay 420 which is compressed. The compressed representation 422 of the overlay 420 may further be referred to as a second representation 422 of the overlay 420. Other uncompressed formats may be a block-based format, sometimes also called tiled format. The uncompressed format may be a direct representation of pixels. The CPU or GPU 404 may produce the uncompressed format or decode it from an image file in a certain format like Joint Photographic Experts Group (JPEG). Other compressed formats may be a block-based entropy coding format, such as JPEG.

Representing the overlay 420 in a compressed format typically reduces the memory bandwidth in connection to the overlay 420 being loaded by the image compositor 415. However, it comes with an overhead cost to provide the representation of the overlay 420 in the compressed format. For example, there will be an additional processing cost when the CPU or GPU 404 provides the RLE-encoded overlay 422, both in the case when the RLE-overlay 422 is directly rendered from an overlay description and in the case when the RLE-overlay 422 is encoded from the bitmap overlay 421. In the latter of these cases, there is also an additional memory bandwidth cost since the CPU or GPU 404 first has to load the bitmap overlay 421 before compressing it. Notably, this overhead cost appears each time a new representation of the overlay 420 in the compressed format is provided. During time periods when the content of the overlay 420 changes between video frames, new compressed representations of the overlay 420 would have to be provided frequently, thereby giving rise to a high overhead cost. Therefore, it is advantageous to use the bitmap overlay 421 when the content of the overlay 420 changes. However, during time periods when the content of the overlay 420 does not change between video frames, it is enough to RLE-encode the overlay 420 once, and then control the image compositor 415 to load the same RLE-encoded overlay for every video frame for the time periods when the content of the overlay 420 does not change. Thus, during periods when the content of the overlay 420 is not updated, or in other words does not change, for example when there is no change of text, animation of an icon, updating of a diagram, change of position of a bounding box, etc., the option of using an RLE-encoded representation of the overlay 420 is advantageous since it reduces the memory bandwidth at a low overhead cost compared to using a raster format representation of the overlay 420.

Therefore, in embodiments disclosed herein when the content of the overlay 420 requires to be re-rendered frequently or within a short time interval, e.g., for an Augmented Reality (AR) overlay during pan-tilt-zoom (PTZ) movements or bounding boxes that move as objects move, then the overlay 420 may be rendered and applied by the uncompressed format, such as a raster format. Once the content of the overlay 420 stays stable for a couple of frames, the overlay may be encoded into the compressed format, such as the RLE format, which may be used by the image compositor 415 instead of the raster format. In other words, embodiments herein make use of the fact that during time periods when the content of the overlay 420 does not change between video frames, it is enough to encode the overlay 420 once, and then control the image compositor 415 to load the same encoded overlay 420 for every video frame for the time periods when the content of the overlay 420 does not change. Thus, during periods when the content of the overlay 420 does not change, for example when it does not move, the option of using an encoded version of the overlay 420 is cheaper from a memory bandwidth point of view compared to using a raster format representation of the overlay memory.

The encoding of the overlay into the compressed format, such as the RLE format, may take a while, but meanwhile the image compositor 415 may use the uncompressed format representation, such as the raster format overlay. Then the memory bandwidth usage will be optimized.

Exemplifying embodiments for adding the overlay 420 to the video sequence 410 will now be described with reference to FIG. 5*a*, FIG. 5*b*, FIG. 5*c* and with further reference to FIGS. 2, 3, 4*a*, 4*b* and 4*c*.

Figure 5A:
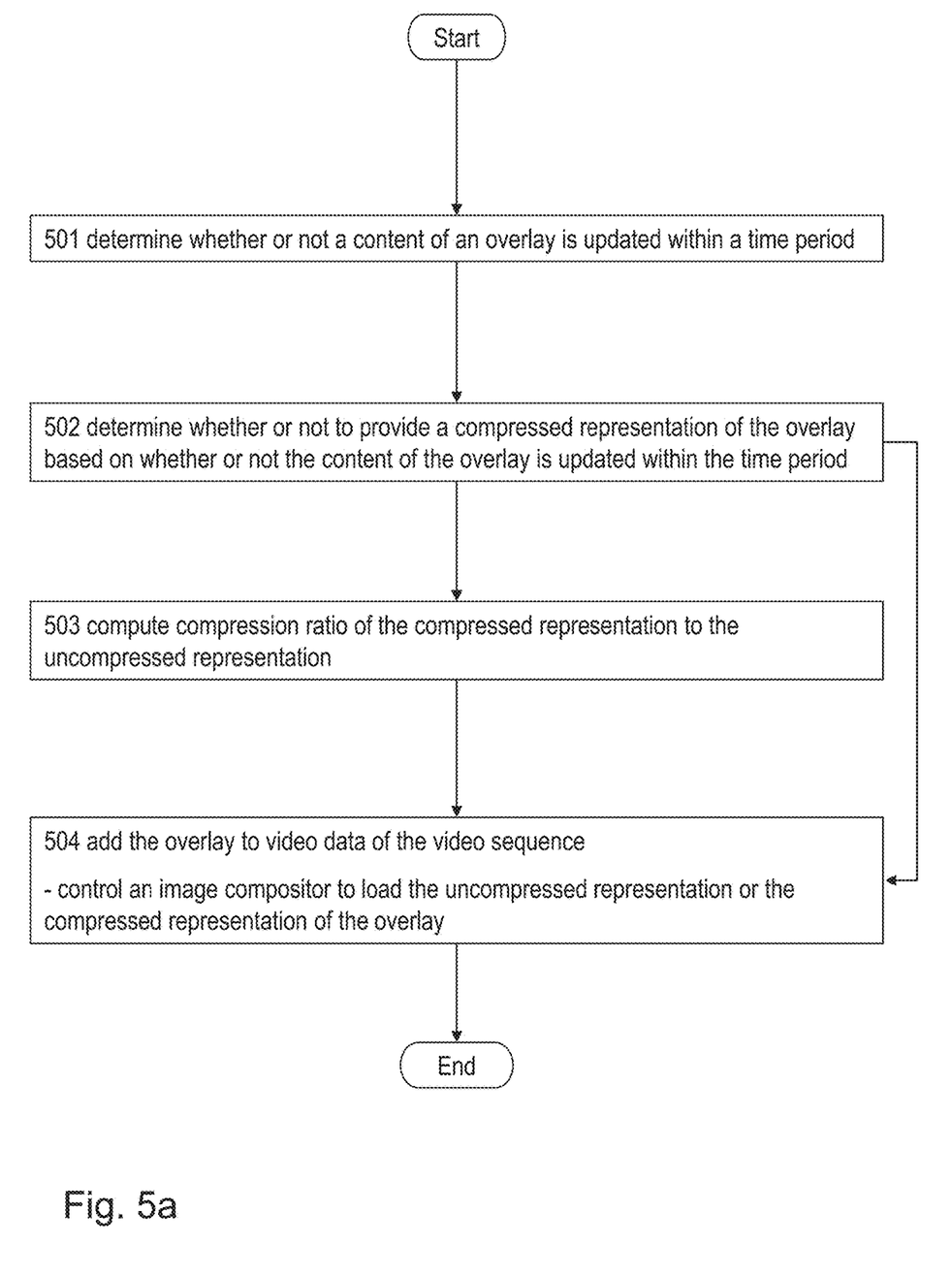
FIG. 5a is a flowchart illustrating embodiments of a method in an image-processing device.

FIG. 5*a* illustrates a flowchart describing a method performed in the image-processing device 400 for adding the overlay 420 to the video sequence 410. The overlay 420 may be a graphic overlay.

In some embodiments the image-processing device 400 is the video camera 120, such as a surveillance camera. The image-processing device 400 may also be the video-server 260.

The below actions may be taken in any suitable order, e.g., in another order than the order presented below.

Action 501

The image-processing device 400 determines whether or not a content of the overlay 420 is updated within a time period T. In some embodiments disclosed herein a length of the time period T is at least two video frames of the video sequence 410. For example, the length of the time period T may be 10-30 video frames in order to avoid too frequent jumps back and forth between the two representation formats i.e., between adding the uncompressed representation 421 and adding the compressed representation 422 of the overlay 420 to the video sequence 410.

Figure 5B:
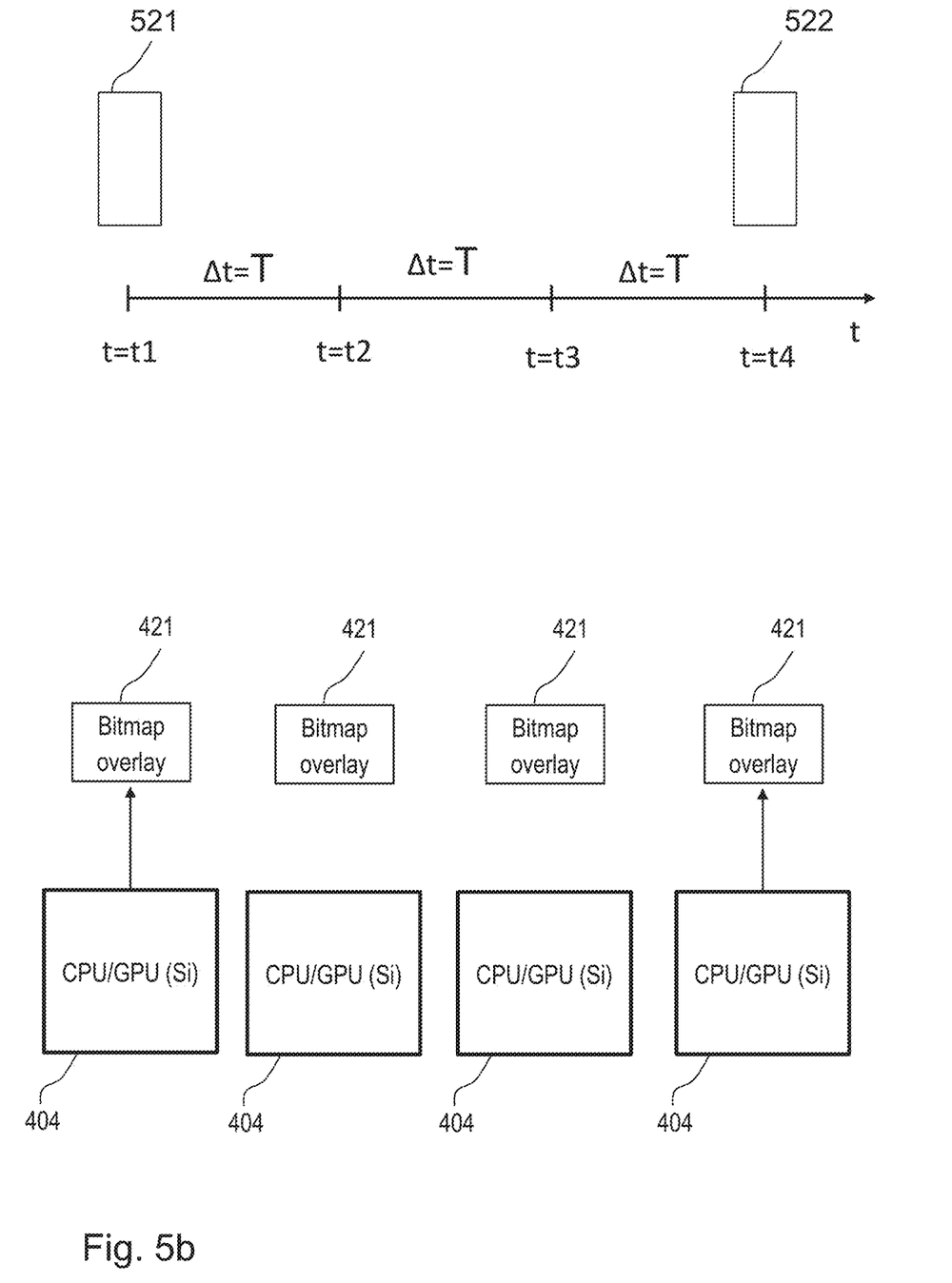
FIG. 5b is a schematic block diagram illustrating embodiments of a method in an image-processing device.
Figure 5C:
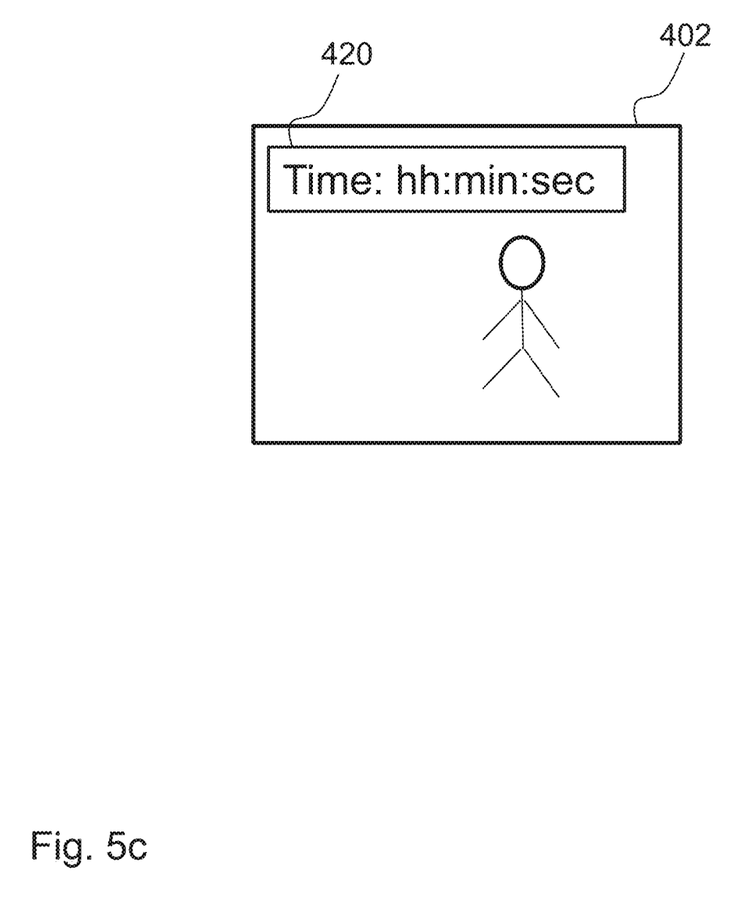
FIG. 5c is a schematic block diagram illustrating embodiments of a method in the image-processing device.

FIG. 5*b* schematically illustrates a timeline with a first time t1 when the image-processing device 400 receives information about the content of the overlay 420. At a second time t2 which is within the time period T from the first time t1 the image-processing device 400 checks whether or not it has received new information about the content of the overlay 420. At a third time t3 which is within the time period T from the second time t2 the image-processing device 400 again checks whether or not it has received new information about the content of the overlay 420. The same procedure is repeated at a fourth time t4 which is within the time period T from the third time t3. The image-processing device 400 may make further checks of whether or not it has received new information about the content of the overlay 420 within the time periods T. The CPU or GPU 404 may perform the actions of receiving and checking.

In some embodiments determining whether or not the content of the overlay 420 is updated within the time period T comprises obtaining first information 521 indicative of a first content of the overlay 420 and determining whether or not second information 522 indicative of a second content of the overlay 420 is obtained within the time period T starting from receiving the first information. The second content may differ from the first content.

As explained above in relation to FIG. 4*b*, the representation of the overlay 420 may be stored in one or more buffers or memory areas. In some embodiments herein at least two buffers are used such that writing and reading representations of the overlay 420 may be performed independently of each other. Therefore, in some embodiments disclosed herein obtaining the first information 521 comprises obtaining a first indication of a first buffer comprising the first content of the overlay 420 and available for reading the first content and wherein obtaining the second information 522 comprises obtaining a second indication of a second buffer comprising the second content of the overlay 420 and available for reading the second content of the overlay 420. The overlay data may comprise the first representation of the overlay 420 in the uncompressed format, such as the raster format or tiled format.

According to FIG. 5*b* the image-processing device 400 receives the first information 521 indicative of the first content of the overlay 420 at the first time t1. Then the image-processing device 400 waits during the time period T until the second time t2 and checks whether or not it has received new information about the content of the overlay 420. However, at the second time t2 the image-processing device 400 does not receive any new information about the content of the overlay 420 nor has the image-processing device 400 received such new information during the time period T from the first time t1. As will be explained in more detail below in action 502 the image-processing device 400 may determine that the content of the overlay 420 has not changed during the time period T and that this means that there is a possibility to save memory bandwidth by encoding and loading the content of the overlay 420 in a compressed representation instead of repeatedly loading the same uncompressed representation of the overlay 420. Also at the third time t3 there is no new received information about the content of the overlay 420. The image-processing device 400 may continue to save memory bandwidth by loading and adding the same compressed representation and not repeatedly loading the same uncompressed representation of the overlay 420.

At the fourth time t4 the image-processing device 400 again checks whether or not it has received new information about the content of the overlay 420. At the fourth time t4 the image-processing device 400 determines that the content of the overlay 420 has been updated and may then determine to stop loading and adding the encoded representation of the overlay 420 and start using the uncompressed representation of the overlay 420. Thus, as soon as the content of the overlay 420 has been updated the encoded representation of the overlay 420 will not be loaded and added any more.

Action 502

The image-processing device 400 determines, based on whether or not the content of the overlay 420 is determined to be updated within the time period T, whether or not to provide the compressed representation 422 of the overlay 420 in the compressed format. The compressed representation format may be used later when adding the overlay 420 to the video sequence 410 which is described below in action 504. It is determined to provide the compressed representation 422 of the overlay 420 in response to determining that the content of the overlay 420 is not updated within the time period T. It is determined to not provide the compressed representation 422 of the overlay 420 in response to determining that the content of the overlay 420 is updated within the time period T.

The image-processing device 400 may determine to provide a specific representation format at the end of the time period T. Further, the encoding of the overlay 420 into the compressed format may take a while, but meanwhile the image compositor 415 may load and add the uncompressed representation of the overlay 420.

In some other embodiments the updating of the overlay 420 is deterministic and may be determined beforehand. An example is provided in FIG. 5*c* in which the overlay 420 displays the time in hours minutes and seconds. For such deterministic overlays the image-processing device 400 may determine whether or not the content of the overlay 420 is updated within the time period T beforehand. Thus, the image-processing device 400 may also determine which representation format to provide beforehand.

Action 503

In some embodiments disclosed herein the image-processing device 400 computes a compression ratio of the compressed representation 422 with respect to the uncompressed representation 421 when the image-processing device 400 has provided the compressed representation. In embodiments disclosed herein the compression ratio may be defined as a ratio of a first memory size required to store the compressed representation 422 of the overlay 420 divided by a second memory size required to store the uncompressed representation 421 of the overlay 420. For example, if the overlay 420 has many varying colour patterns, then the compression ratio will be lower than if the overlay 420 has large areas with homogeneous colour.

By computing the compression ratio the image-processing device 400 may check that the compressed representation 422 actually requires less memory bandwidth than the uncompressed representation 421. If the compression ratio is not high enough, for example if it isn't larger or substantially larger than a threshold compression ratio then the image-processing device 400 may continue to load and add the uncompressed representation 421 to video data of the video frame 402 of the video sequence 410 although it has already provided the compressed representation 422.

Action 504

The image-processing device 400 then adds the overlay 420 to video data of the video frame 402 of the video sequence 410.

In general, adding the overlay 420 may comprise to exchange image data in the video frame 402 with image data in the representation of the overlay 420 or to blend image data in the video frame 402 with image data in the representation of the overlay 420.

When the compressed representation 422 of the overlay 420 in the compressed format has been provided the image-processing device 400 adds the compressed representation 422 of the overlay 420 to video data of the video frame 402 of the video sequence 410 if the compression ratio of the compressed representation 422 of the overlay 420 with respect to the uncompressed representation 421 of the overlay 420 is above a threshold, while if the compression ratio is below the threshold, the image-processing device 400 adds the uncompressed representation 421 of the overlay 420 to video data of the video frame 402 of the video sequence 410.

When the compressed representation 422 of the overlay 420 in the compressed format has not been provided, the image-processing device 400 adds the uncompressed representation 421 of the overlay 420 to video data of the video frame 402 of the video sequence 410. Thus, determining to add the uncompressed representation 421 or the compressed representation 422 is based at least on whether the compressed representation 422 has been provided or not.

Adding the overlay 420 to the video data of the video frame 402 of the video sequence 410 may comprise providing a representation of the overlay.

When the representation format to be added is the uncompressed format, the image-processing device 400 provides the first representation of the overlay 420 in the uncompressed format, such as the bitmap overlay 421. Examples of how to provide, or in other words render, the first representation was described above in relation to FIG. 4b. For example, the CPU/GPU 404 may receive the description of the overlay with details of the overlay 420 to be added to the video frame 420. The description of the overlay may be in the form of a text file or a graphics file, detailing the content and visual appearance of the overlay 420. The description of the overlay may be in the form of a two-dimensional vector-based description, such as in SVG format, or a drawing command or instruction for a vector graphics library. The description of the overlay may also be a 3D graphics-based description in the form of a command, a texture and a shader.

In some other embodiments the representation of the overlay 420 may be read from a library of rendered overlays.

The image-processing device 400 may control the image compositor 415 to load the uncompressed representation of the overlay 420 in the uncompressed format for adding it to the video data of the video frame 402 of the video sequence 410 when the compressed representation 422 of the overlay 420 in the compressed format has not been provided or when the compression ratio is below the threshold.

When the representation format to be added is the compressed format, the image-processing device 400 provides the second representation of the overlay 420 in the compressed format, such as the RLE overlay 422. For example, the encoder, e.g., implemented in software together with the CPU or GPU 404, may encode the first, uncompressed format, representation of the overlay 420 into the second, compressed format, representation of the overlay 420. For example, the RLE encoder may run-length-encode the raster format representation of the overlay 420 into the RLE representation of the overlay. In some other embodiments, the image-processing device 400 provides the second representation of the overlay 420 from a description of the overlay 420 or from a library of rendered encoded overlays.

The image-processing device 400 may control the image compositor 415 to decode the compressed representation of the overlay 420 in the compressed format and add the decoded compressed representation of the overlay 420 to the video data of the video frame 402 of the video sequence 410 when the compressed representation 422 of the overlay 420 in the compressed format has been provided and the compression ratio is above the threshold.

In some embodiments herein the image compositor 415 is controlled to read a specific representation out of the first representation and the second representation by sending a control message to the image compositor 415 with an address to a register in which the specific representation is stored.

In one example embodiment an RLE decoding, or in other words decompression, comprises browsing a message formed of start pixels, an associated pixel value and an associated number of repetition of the pixel value, and adding the pixel value to a sequence of pixels from the start pixel which is as long as the number of repetition of the pixel value.

The uncompressed format may be a direct representation of image pixels, such as a raster format or a block-based format. The compressed format may be the RLE format or a block-based entropy coding format, such as JPEG.

Providing the compressed representation 422 of the overlay 420 in the compressed format may comprise any one or more of:

compressing the uncompressed representation 421 of the overlay 420 in the uncompressed format to the compressed representation 422 of the overlay 420 in the compressed format; and rendering the compressed representation 422 of the overlay 420 based on a description of the overlay 420.

Further, when the representation format is determined to be the compressed format, then the image-processing device 400 may provide the same compressed representation 422 of the overlay 420 in the compressed format to multiple video frames of the video sequence 410 as long as there is no update of the content of the overlay 420. This will save memory bandwidth as there is no need to provide further representations of the overlay 420 as long as there is no update of the content of the overlay 420.

Further RLE encoded overlays may also be added to the video frame 402. For example, overlays with static content may be added to the video frame 402 and other video frames in the video sequence 410.

Even though embodiments herein have mainly been described using RLE as an encoding format other types of compression of the overlay 420 are also possible.

Figure 6:
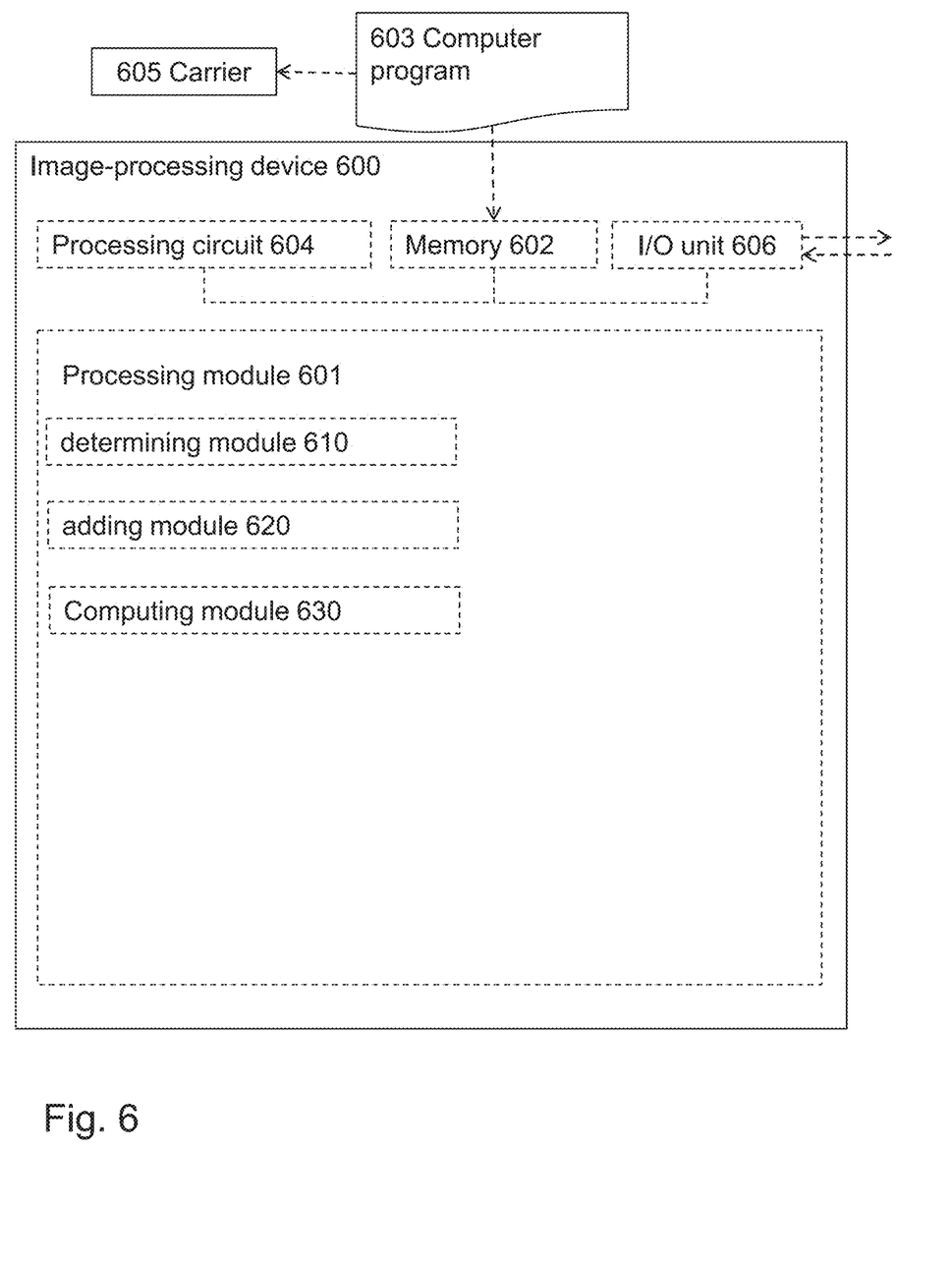
FIG. 6 is a schematic block diagram illustrating embodiments of the image-processing device.

With reference to FIG. 6, a schematic block diagram of embodiments of an image-processing device 600 is shown. The image-processing device 600 corresponds to any of the image-processing devices 110 of FIG. 1 or the image-processing device 400. Thus, the image-processing device 600 may comprise or be any of a camera, such as a surveillance camera, a monitoring camera, a camcorder, a network video recorder, and the wireless communication device 130. In particular, the image-processing device 600 may be the camera 120, such as a surveillance video camera, or the video-server 260.

As mentioned above, the image-processing device 600 is configured to perform the method according to FIG. 5a.

The image-processing device 600 may further comprise a processing module 601, such as a means for performing the methods described herein. The means may be embodied in the form of one or more hardware modules and/or one or more software modules.

The image-processing device 600 may further comprise a memory 602. The memory may comprise, such as contain or store, instructions, e.g. in the form of a computer program 603, which may comprise computer readable code units which when executed on the image-processing device 600 causes the image-processing device 600 to perform the method of adding the overlay 420 to the video sequence 410.

The image-processing device 600 may comprise a computer and then the computer readable code units may be executed on the computer and cause the computer to perform the method of FIG. 5a.

According to some embodiments herein, the image-processing device 600 and/or the processing module 601 comprises a processing circuit 604 as an exemplifying hardware module, which may comprise one or more processors. Accordingly, the processing module 601 may be embodied in the form of, or 'realized by', the processing circuit 604. The instructions may be executable by the processing circuit 604, whereby the image-processing device 600 is operative to perform the methods of FIG. 5a as described above. As another example, the instructions, when executed by the image-processing device 600 and/or the processing circuit 604, may cause the image-processing device 600 to perform the methods according to FIG. 5a.

In view of the above, in one example, there is provided an image-processing device 600 for adding the overlay 420 to the video sequence 410.

Again, the memory 602 contains the instructions executable by said processing circuit 604 whereby the image-processing device 600 is operative for performing the method according to FIG. 5a.

FIG. 6 further illustrates a carrier 605, or program carrier, which comprises the computer program 603 as described directly above. The carrier 605 may be one of an electronic signal, an optical signal, a radio signal and a computer readable medium.

In some embodiments, the image-processing device 600 and/or the processing module 601 may comprise one or more of a determining module 610, an adding module 620, and a computing module 630 as exemplifying hardware modules. In other examples, one or more of the aforementioned exemplifying hardware modules may be implemented as one or more software modules.

Moreover, the processing module 601 may comprise an Input/Output unit 606. According to an embodiment, the Input/Output unit 606 may comprise an image sensor configured for capturing the raw video frames described above such as the raw video frames comprised in the video stream 310 from the image sensor 301.

According to the various embodiments described above, the image-processing device 600 and/or the processing module 601 and/or the determining module 610 is configured to determine whether or not the content of the overlay 420 is updated within the time period T.

The image-processing device 600 and/or the processing module 601 and/or the determining module 610 is further configured to determine, based on whether or not the content of the overlay 420 is determined to be updated within the time period T, whether or not to provide the compressed representation 422 of the overlay 420. It is determined to provide the compressed representation 422 in response to determining that the content of the overlay 420 is not updated within the time period T. It is determined to not provide the compressed representation 422 in response to determining that the content of the overlay 420 is updated within the time period T.

When the compressed representation 422 of the overlay 420 has been provided, the image-processing device 600 and/or the processing module 601 and/or the adding module 620 is further configured to, add the compressed representation 422 of the overlay 420 to video data of a video frame 402 of the video sequence 410 if a compression ratio of the compressed representation 422 with respect to the uncompressed representation 421 of the overlay 420 is above a threshold, while if the compression ratio is below the threshold, the image-processing device 600 and/or the processing module 601 and/or the adding module 620 is further configured to, add the uncompressed representation 421 of the overlay 420 to video data of the video frame 402 of the video sequence 410.

When the compressed representation 422 of the overlay 420 has not been provided, the image-processing device 600 and/or the processing module 601 and/or the adding module 620 is further configured to, add the uncompressed representation 421 of the overlay 420 to video data of the video frame 402 of the video sequence 410.

The image-processing device 600 and/or the processing module 601 and/or the computing module 630 may be further configured to compute the compression ratio of the compressed representation to the uncompressed representation when the image-processing device 400 has provided the compressed representation.

In some embodiments herein the image-processing device 600 and/or the processing module 601 and/or the adding module 620 is further configured to add the overlay 420 in the determined representation format to the video data of the video frame 402 of the video sequence 410 by being configured to:

control the image compositor 415 to load the uncompressed representation 421 of the overlay 420 in the uncompressed format for adding it to the video data of the video frame 402 of the video sequence 410 when the compressed representation 422 of the overlay 420 in the compressed format has not been provided or when the compression ratio is below the threshold; or control the image compositor 415 to decode the compressed representation 422 of the overlay 420 in the compressed format and add the decoded compressed representation 422 of the overlay 420 to the video data of the video frame 402 of the video sequence 410 when the compressed representation (422) of the overlay (420) in the compressed format has been provided and the compression ratio is above the threshold.

In some embodiments herein the image-processing device 600 and/or the processing module 601 and/or the adding module 620 is configured to provide the compressed representation 422 of the overlay 420 in the compressed format by being configured to do any one or more of.

compress the uncompressed representation 421 of the overlay 420 in the uncompressed format to the compressed representation 422 of the overlay 420 in the compressed format; and render the compressed representation 422 of the overlay 420 based on the description of the overlay 420.

The image-processing device 600 and/or the processing module 601 and/or the determining module 610 may further be configured to determine whether or not the content of the overlay 420 is updated within the time period T by being configured to receive first information 521 indicative of the first content of the overlay 420 and determine whether or not second information 522 indicative of the second content of the overlay 420 is received within the time period T starting from receiving the first information.

The image-processing device 600 and/or the processing module 601 and/or the determining module 610 may further be configured to obtain the first information 521 by being configured to obtain the first indication of the first buffer comprising the first content of the overlay 420 and available for reading the first content and to obtain the second indication of the second buffer comprising the second content of the overlay 420 and available for reading the second content of the overlay 420.

As used herein, the term "module" may refer to one or more functional modules, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a connecting means, providing means, configuring means, responding means, disabling means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by an image-processing device, for adding an overlay to a video sequence, the method comprising:
   determining, based on a representation of the overlay stored in one or more buffers or memory areas of the image-processing device, whether or not a content of the overlay is updated within a time period;
   determining, based on whether or not the content of the overlay is determined to be updated within the time period, whether or not to provide, by a Central Processing Unit, CPU, or Graphic Processing Unit, GPU, a compressed representation of the overlay in a compressed format to an image compositor, wherein it is determined to provide the compressed representation of the overlay in response to determining that the content of the overlay is not updated within the time period, and wherein it is determined to not provide the compressed representation of the overlay in response to determining that the content of the overlay is updated within the time period; and
   when the compressed representation of the overlay in the compressed format has been provided, decoding and adding, by the image compositor, the compressed representation of the overlay to video data of a video frame of the video sequence if a compression ratio of the compressed representation of the overlay with respect to an uncompressed representation of the overlay in an uncompressed format is above a threshold, while if the compression ratio is below the threshold, adding the uncompressed representation of the overlay to video data of the video frame of the video sequence, and
   when the compressed representation of the overlay in the compressed format has not been provided, adding the uncompressed representation of the overlay to video data of the video frame of the video sequence.

2. The method according to claim 1, further comprising: computing the compression ratio of the compressed representation with respect to the uncompressed representation when the image-processing device has provided the compressed representation.

3. The method according to claim 1, wherein adding the overlay to the video data of the video frame of the video sequence comprises:
   controlling an image compositor to load the uncompressed representation of the overlay in the uncompressed format for adding it to the video data of the video frame of the video sequence when the compressed representation of the overlay in the compressed format has not been provided or when the compression ratio is below the threshold; or controlling the image compositor to decode the compressed representation of the overlay in the compressed format and add the decoded compressed representation of the overlay to the video data of the video frame of the video sequence when the compressed representation of the overlay in the compressed format has been provided and the compression ratio is above the threshold.

4. The method according to claim 1, wherein the uncompressed format is a direct representation of image pixels, such as a raster format or a block-based format.

5. The method according to claim 2, wherein the compressed format is a Run-Length Encoding, RLE, format or a block-based entropy coding format, such as Joint Photographic Experts Group, JPEG.

6. The method according to claim 3, wherein providing the compressed representation of the overlay in the compressed format comprises any one or more of:

compressing the uncompressed representation of the overlay in the uncompressed format to the compressed representation of the overlay in the compressed format; and rendering the compressed representation of the overlay based on a description of the overlay.

7. The method according to claim 1, wherein determining whether or not the content of the overlay is updated within the time period comprises obtaining first information indicative of a first content of the overlay and determining whether or not second information indicative of a second content of the overlay is obtained within the time period starting from obtaining the first information.

8. The method according to claim 7, wherein the second content differs from the first content.

9. The method according to claim 7, wherein obtaining the first information comprises obtaining a first indication of a first buffer comprising the first content of the overlay and available for reading the first content and wherein obtaining the second information comprises obtaining a second indication of a second buffer comprising the second content of the overlay and available for reading the second content of the overlay.

10. The method according to claim 1, wherein a length of the time period is at least two video frames of the video sequence.

11. The method according to claim 1, wherein the overlay is a graphic overlay.

12. An image-processing device configured to perform the method according to claim 1.

13. The image-processing device according to claim 12, wherein the image-processing device is a video camera, such as a surveillance camera, or a video-server.

14. A non-transitory computer readable memory having stored therein program, comprising computer readable code units which when executed on an image-processing device causes the image-processing device to perform the method according to claim 1.

* * * * *